US008608988B2

(12) United States Patent
Bowles et al.

(10) Patent No.: US 8,608,988 B2
(45) Date of Patent: Dec. 17, 2013

(54) CURABLE PHOTOCHROMIC COMPOSITIONS AND OPTICAL ARTICLES PREPARED THEREFROM

(75) Inventors: Steven E. Bowles, Pittsburgh, PA (US); Cynthia Kutchko, Pittsburgh, PA (US); Paul H. Lamers, Allison Park, PA (US); Jason R. Lewis, Monaca, PA (US); David E. Sartori, Pittsburgh, PA (US); Robert W. Walters, Export, PA (US); Feng Wang, Export, PA (US)

(73) Assignee: Transitions Optical, Inc., Pinellas Park, FL (US)

( * ) Notice: Subject to any disclaimer, the term of this patent is extended or adjusted under 35 U.S.C. 154(b) by 152 days.

(21) Appl. No.: 13/293,255

(22) Filed: Nov. 10, 2011

(65) Prior Publication Data

US 2012/0212840 A1  Aug. 23, 2012

Related U.S. Application Data

(60) Provisional application No. 61/416,340, filed on Nov. 23, 2010.

(51) Int. Cl.
*G02B 5/23* (2006.01)
*G02B 13/00* (2006.01)
*G02B 3/00* (2006.01)

(52) U.S. Cl.
USPC .......... 252/586; 252/582; 264/1.32; 359/355; 359/722; 428/412; 544/99; 548/409; 549/389

(58) Field of Classification Search
USPC .......... 252/582, 586; 264/1.32; 359/355, 722; 428/412; 544/99; 548/409; 549/389
See application file for complete search history.

(56) References Cited

U.S. PATENT DOCUMENTS

| 3,971,872 | A | 7/1976 | LeBoeuf |
| 4,681,811 | A | 7/1987 | Simpson et al. |
| 4,873,029 | A | 10/1989 | Blum |
| 4,904,525 | A | 2/1990 | Taniguchi et al. |
| 4,931,220 | A | 6/1990 | Haynes et al. |
| 5,104,692 | A | 4/1992 | Belmares |
| 5,166,345 | A | 11/1992 | Akashi et al. |
| 5,236,958 | A | 8/1993 | Miyashita |
| 5,252,742 | A | 10/1993 | Miyashita |
| 5,359,085 | A | 10/1994 | Iwamoto et al. |
| 5,488,119 | A | 1/1996 | Fischer-Reimann et al. |
| 5,645,767 | A | 7/1997 | Van Gemert |
| 5,658,501 | A | 8/1997 | Kumar et al. |
| 5,821,287 | A | 10/1998 | Hu et al. |
| 6,113,814 | A | 9/2000 | Gemert et al. |
| 6,127,505 | A | 10/2000 | Slagel |
| 6,153,126 | A | 11/2000 | Kumar |
| 6,175,450 | B1 | 1/2001 | Andreani et al. |
| 6,187,444 | B1 | 2/2001 | Bowles, III et al. |
| 6,296,785 | B1 | 10/2001 | Nelson et al. |
| 6,348,604 | B1 | 2/2002 | Nelson et al. |
| 6,353,102 | B1 | 3/2002 | Kumar |
| 6,436,525 | B1 * | 8/2002 | Welch et al. ................ 428/332 |
| 6,474,695 | B1 | 11/2002 | Schneider et al. |
| 6,589,452 | B2 | 7/2003 | Asher et al. |
| 6,768,581 | B1 | 7/2004 | Yip et al. |
| 7,410,691 | B2 | 8/2008 | Blackburn et al. |
| 7,507,358 | B2 | 3/2009 | Morris et al. |
| 2001/0025948 | A1 * | 10/2001 | Walters et al. ............... 252/586 |
| 2001/0050356 | A1 * | 12/2001 | Crano et al. ................. 252/582 |
| 2002/0142248 | A1 | 10/2002 | Dubois et al. |
| 2003/0174560 | A1 | 9/2003 | Dahmen et al. |
| 2004/0099972 | A1 | 5/2004 | Morris et al. |
| 2010/0124649 | A1 | 5/2010 | Rukavina et al. |

FOREIGN PATENT DOCUMENTS

| WO | 00/33111 A1 | 6/2000 | |
| WO | 0034410 A1 | 6/2000 | |
| WO | 2007070627 A2 | 6/2007 | |
| WO | WO 2007/070627 A2 * | 6/2007 | ............. C08G 18/66 |

* cited by examiner

*Primary Examiner* — Bijan Ahvazi
(74) *Attorney, Agent, or Firm* — Deborah M. Altman

(57) ABSTRACT

The present invention provides a curable, organic polymeric photochromic composition comprising: a photochromic amount of at least one photochromic material; a polymeric polyol having carbonate groups along its backbone and having a number average molecular weight greater than 5000 g/mole; and a curing agent having reactive functional groups capable of reacting with hydroxyl groups on the polymeric polyol. After curing and after the Photochromic Performance Test the composition demonstrates a $T_{1/2}$ fade rate of less than 200 seconds.

Also provided is a photochromic article comprising a rigid substrate and a photochromic organic polymeric coating applied to a surface of the substrate. The photochromic organic polymeric coating comprises the composition described above.

11 Claims, No Drawings

US 8,608,988 B2

CURABLE PHOTOCHROMIC COMPOSITIONS AND OPTICAL ARTICLES PREPARED THEREFROM

CROSS REFERENCE TO RELATED APPLICATIONS

This application claims the benefit of priority of U.S. Provisional Patent Application No. 61/416,340, filed Nov. 23, 2010, all of which document is hereby incorporated herein by reference.

FIELD OF THE INVENTION

The present invention relates to curable, organic polymeric photochromic compositions and photochromic articles comprising a rigid substrate to which a photochromic polymeric composition is applied as a coating.

BACKGROUND OF THE INVENTION

Optical articles that provide good imaging qualities while reducing the transmission of incident light into the eye are needed for a variety of applications, such as sunglasses, vision correcting ophthalmic lenses, plano lenses and fashion lenses, e.g., non-prescription and prescription lenses, sport masks, face shields, goggles, visors camera lenses, windows, automotive windshields and aircraft and automotive transparencies, e.g., T-roofs, sidelights and backlights. Responsive to that need, photochromic plastic articles used for optical applications have been given considerable attention. In particular, photochromic ophthalmic plastic lenses have been of interest because of the weight advantage they offer, vis-à-vis, glass lenses.

Photochromic plastic articles have been prepared by incorporating the photochromic material into the plastic substrate by surface imbibition techniques. In this method, photochromic dyes are incorporated into the subsurface region of a plastic article, such as a lens, by first applying one or more photochromic dyes/compounds to the surface of the plastic article, either as the neat photochromic dye/compound or dissolved in a polymeric carrier or organic solvent carrier, and then applying heat to the coated surface to cause the photochromic dye/compound(s) to diffuse into the subsurface region of the plastic article (a process commonly referred to as "imbibition"). The plastic substrates of such photochromic plastic articles are considered to have sufficient free volume within the polymer matrix to allow photochromic compounds to transform from the colorless form into the colored form, and then revert to their original colorless form.

There are, however, certain polymer matrices that may not to have sufficient free volume to allow the aforedescribed electrocyclic mechanism to occur sufficiently to permit their use as a substrate for imbibed (or internally incorporated) photochromic materials for commercially acceptable photochromic applications. Non-limiting examples of such substrates include thermoset polymer matrices, such as those prepared from allyl diglycol carbonate monomers, e.g., diethylene glycol bis(allyl carbonate), and copolymers thereof; the commonly known thermoplastic bisphenol A-based polycarbonates; and highly cross-linked optical polymers.

To allow the use of thermoset polymers, thermoplastic polycarbonates, and highly cross-linked optical polymeric materials as plastic substrates for photochromic articles, it has been proposed to apply photochromic coatings to the surface of such plastic substrates. It has been an ongoing challenge to minimize the amount of time needed to activate and deactivate the photochromic materials contained in the coatings, in response to consumer demands.

BRIEF SUMMARY OF THE INVENTION

In accordance with the present invention, there is provided a curable, organic polymeric photochromic composition comprising: a photochromic amount of at least one photochromic material; a polymeric polyol having carbonate groups along its backbone and having a number average molecular weight greater than 5000 g/mole as determined by GPC as described herein below; and a curing agent having reactive functional groups capable of reacting with hydroxyl groups on the polymeric polyol. After curing and after the Photochromic Performance Test, the composition demonstrates a $T_{1/2}$ fade rate of less than 200 seconds (determined as described in detail herein below).

Also provided by the present invention is a photochromic article comprising a rigid substrate and a photochromic organic polymeric coating applied to a surface of the substrate. The photochromic organic polymeric coating comprises the composition described above.

DETAILED DESCRIPTION OF THE INVENTION

For purposes of this specification (other than in the operating examples), unless otherwise indicated, all numbers expressing quantities and ranges of ingredients, reaction conditions, etc., such as those expressing refractive indices and wavelengths, that are used in the following description and claims are to be understood as modified in all instances by the term "about". Accordingly, unless indicated to the contrary, the numerical parameters set forth in this specification and attached claims are approximations that can vary depending upon the desired properties sought for the articles of the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, numerical values set forth in specific examples are reported as precisely as possible. Any numerical value, however, inherently contains certain errors necessarily resulting from the standard deviation found in their respective testing measurements. Also, it should be understood that any numerical range recited herein is intended to include all sub-ranges subsumed therein. For example, a range "1 to 10" is intended to include all sub-ranges between and including the recited minimum value of 1 and the recited maximum value of 10; namely, a range having a minimum value equal to or greater than 1 and a maximum value of equal to or less than 10. Because the disclosed ranges are continuous, they include every value between the minimum and maximum values. Unless expressly indicated otherwise, the various numerical ranges specified in this application are, as stated, approximations.

As used in the following description and claims, the following terms have the indicated meanings:

The terms "acrylic" and "acrylate" are used interchangeably (unless to do so would alter the intended meaning) and include acrylic acid, lower alkyl-substituted acrylic acids, e.g., $C_1$-$C_5$ substituted acrylic acids, such as methacrylic acid, ethacrylic acid, etc, and derivatives of such acrylic acids, such as their $C_1$-$C_5$ alkyl esters, e.g., methyl acrylate, methyl methacrylate, etc., unless clearly indicated otherwise. The terms "(meth)acrylic" or "(meth)acrylate" are intended to cover both the acrylic/acrylate and methacrylic/methacrylate forms of the indicated material, e.g., a (meth)acrylic monomer.

The term "cure", "cured" or similar terms, as used in connection with a cured or curable composition, e.g., a "cured composition" of some specific description is intended to mean that at least a portion of the polymerizable and/or crosslinkable components that form the curable composition are at least partially polymerized and/or cross-linked. In a non-limiting embodiment, the degree of crosslinking can range from 5% to 100% of complete crosslinking. In alternate non-limiting embodiments, the degree of crosslinking can range from 30% to 95%, such as 35% to 95%, or 50 to 95%, or 50% to 85% of full crosslinking. The degree of crosslinking can range between any combination of the previously stated values, inclusive of the recited values.

The term "film", as used in connection with the unstretched cross-linked polyhydroxy polymer, means and includes a layer that may be described either as a film or coating. The coating or film of unstretched cross-linked polyhydroxy polymer has a thickness within the range of thicknesses specified in the specification. The coating or film is also referred to herein as a coating/film.

The terms "on", "appended to", "affixed to", "bonded to", "adhered to" or terms of like import means that the subject coating, film or layer is either directly connected to (superimposed on and in direct contact with) the object surface, or indirectly connected to the object surface through one or more other coatings, films or layers (which are superposed on and in direct contact with the object surface).

The term "ophthalmic" refers to elements and articles that are associated with the eye and vision, such as but not limited to lenses for eyewear, e.g., corrective and non-corrective lenses, and magnifying lenses.

The term "rigid", as used for example in connection with a substrate for a photochromic article, means that the specified item is self supporting.

The term "optical", "optically clear", or terms of like import means that the specified material, e.g., substrate, film, coating, etc., exhibits a light transmission value (transmits incident light) of at least 4 percent, and exhibits a haze value of less than 1 percent, e.g., a haze value of less than 0.5 percent, when measured at 550 nanometers by, for example, a Haze Gard Plus Instrument.

The term "polarizing material" means a material that absorbs one of two orthogonal plane-polarized components of transmitted radiation more strongly than the other. Non-limiting embodiments of polarizing materials include iodine, iodates, dichroic materials such as indigoids, thioindigoids, merocyanines, indans, azo and poly(azo) dyes, benzoquinones, naphthoquinones, anthraquinones, (poly)anthraquinones, and anthrapyrimidinones.

The term "substrate", as used for example in connection with the term rigid substrate, means an article having at least one surface that is capable of accommodating a photochromic coating, e.g., a photochromic polymeric coating; namely, the substrate has a surface to which a photochromic coating can be applied. Non-limiting embodiments of the shape the surface of the substrate can have include, round, flat, cylindrical, spherical, planar, substantially planar, plano-concave and/or plano-convex, curved, including but not limited to, convex and/or concave, as exemplified by the various base curves used for ophthalmic lenses.

The term "transparent", as used for example in connection with a substrate, film, material and/or coating, means that the indicated substrate, coating, film and/or material has the property of transmitting light without appreciable scattering so that objects lying beyond are seen clearly.

The curable compositions of the present invention comprise a photochromic amount of at least one photochromic material. Photochromic materials, e.g., dyes/compounds or compositions containing such dye/compounds, that may be utilized for the photochromic composition are inorganic and/or organic photochromic compounds and/or substances containing such organic photochromic compounds that are currently known to those skilled in the art or that are later discovered. The particular photochromic material(s), e.g., compound(s), chosen will depend on the ultimate application of the photochromic composition and the color or hue desired for that application. When two or more photochromic compounds are used in combination, they are generally chosen to complement one another to produce a desired color or hue.

Inorganic photochromic material typically contains crystallites of silver halide, cadmium halide and/or copper halide. Generally, the halide material is the chloride and bromide. Other inorganic photochromic materials may be prepared by the addition of europium (II) and/or cerium (III) to a mineral glass, such as a soda-silica glass.

Non-limiting examples of organic photochromic compounds that may be used in the photochromic polymer composition include benzopyrans, naphthopyrans, e.g., naphtho[1,2-b]pyrans, naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57 and in U.S. Pat. No. 5,658,501 at column 1, line 64 to column 13, line 36, which disclosures are incorporated herein by reference. Additional non-limiting examples of organic photochromic compounds that may be used include oxazines, such as benzoxazines, naphthoxazines, and spiro(indoline)pyridobenzoxazines. Other non-limiting examples of photochromic substances that may be used are photochromic metal dithizonates, e.g., mercury dithizonates; fulgides and fulgimides, e.g. the 3-furyl and 3-thienyl fulgides and fulgimides, which are described in U.S. Pat. No. 4,931,220 at column 20, line 5 through column 21, line 38, which disclosure is incorporated herein by reference; diarylethenes, which are described in U.S. Patent Application 2003/0174560 from paragraph [0025] to [0086], which disclosure is incorporated herein by reference; and mixtures of any of the aforementioned photochromic materials/compounds.

Further non-limiting examples of organic photochromic compounds, polymerizable photochromic compounds and complementary photochromic compounds are described in the following U.S. Patents:

U.S. Pat. No. 5,166,345 at column 3, line 36 to column 14, line 3;

U.S. Pat. No. 5,236,958 at column 1, line 45 to column 6, line 65;

U.S. Pat. No. 5,252,742 at column 1, line 45 to column 6, line 65;

U.S. Pat. No. 5,359,085 at column 5, line 25 to column 19, line 55;

U.S. Pat. No. 5,488,119 at column 1, line 29 to column 7, line 65;

U.S. Pat. No. 5,821,287 at column 3, line 5 to column 11, line 39;

U.S. Pat. No. 6,113,814 at column 2, line 23 to column 23, line 29;

U.S. Pat. No. 6,153,126 at column 2, line 18 to column 8, line 60;

U.S. Pat. No. 6,296,785 at column 2 line 47 to column 31, line 5;

U.S. Pat. No. 6,348,604 at column 3, line 26 to column 17, line 15; and

U.S. Pat. No. 6,353,102 at column 1, line 62 to column 11, line 64, which disclosures are incorporated herein by reference.

The photochromic composition may contain one photochromic compound or a mixture of two or more photochromic compounds, as desired. Mixtures of photochromic compounds can be used to attain certain activated colors, such as a near neutral gray or near neutral brown. See, for example, U.S. Pat. No. 5,645,767, column 12, line 66 to column 13, line 19, which describes the parameters that define neutral gray and brown colors. Such disclosure is incorporated herein by reference.

The photochromic material(s) described herein can be incorporated into the curable composition by addition to the composition and/or by dissolving it in a solvent before adding it to the curable composition.

The amount of photochromic material present in the composition is that amount which is sufficient to exhibit a desired change in optical density (ΔOD) when the cured composition is exposed to ultraviolet (UV) radiation, e.g., a photochromic amount. Typically, a sufficient amount is used to produce a photochromic effect discernible to the naked eye upon activation. Generally, such amount can be described as a photochromic amount. The particular amount used depends often upon the intensity of color desired upon irradiation thereof and upon the method used to incorporate the photochromic materials. The more photochromic material incorporated, the greater is the color intensity up to a certain limit.

Typically, the amount of active photochromic material used in the photochromic composition may range from 0.5 to 40.0 weight percent, based on the total weight of resin(s) used to produce the composition. The relative amounts of photochromic material(s) used can vary and will depend in part upon the relative intensities of the color of the activated form of the photochromic compound(s), the ultimate color desired, and the solubility or dispersibility of the photochromic material(s) in the polymeric composition. In certain embodiments, the concentration of active photochromic material(s) within the photochromic composition may range from 1.0 to 30 weight percent, such as from 3 to 20 weight percent, or from 3 to 10 weight percent (based on the total weight of resin solids in the composition.) The amount of photochromic material in the composition may range between any combinations of these values, inclusive of the recited values.

The curable composition of the present invention further comprises a polymeric polyol, typically a diol, having carbonate groups along its backbone. The composition may contain a single such polymeric polyol or a mixture of different polymeric polyols having carbonate groups along their backbones. Other linkages such as ester, amide, ether, urethane, and the like may also occur along the polymeric backbone, examples of which are described below. The polymeric polyol usually has a number average molecular weight greater than 5,000 g/mole. Typically the polymeric polyol has a number average molecular weight greater than 5000 g/mole, usually greater than 6000 g/mole or greater than 8,000 g/mole. Also, the polymeric polyol typically has a number average molecular weight of 20,000 g/mole or less, such as 10,000 g/mole or less, 8,000 g/mole or less, or 7,000 g/mole or less. The number average molecular weight of the polymeric polyol may range between any of the recited ranges. For purposes of the present invention, in the specification and in the claims, the number average molecule weight of the polymeric polyol is determined using gel permeation chromatography ("GPS") using a polystyrene standard. In certain embodiments, the polymeric polyol also has a polydispersity index less than or equal to 2.0, or 1.50, often less than or equal to 1.40, or less than or equal to 1.30. A polydispersity index less than 1.5 is particularly useful when the polymeric polyol is a polycarbonate diol with no other functional linkages along the polymeric backbone.

Suitable polycarbonate functional diols can be obtained, for example, by isolating higher molecular weight polycarbonate functional diols from mixtures of polycarbonate functional diols having a high polydispersity index. In certain embodiments of the present invention, the polycarbonate functional diol is obtained by isolating higher molecular weight polycarbonate functional diols from a mixture of aliphatic polycarbonate diols commercially available as PC-1122 from Stahl USA, ETERACOLL™ PH-200D, PH-200 and UH-200 all from Ube Chemical, DURANOL™ T5652 from AsahiKASEI, or RAVECARB™ 107 from Enichem. The polycarbonate functional diol is purified by washing the mixture with methanol or other suitable solvent and removing the low molecular weight fractions until the polydispersity index of the remaining sample is less than or equal to 1.50.

As noted above, the polymeric polyol can contain urethane linkages or blocks of urethane linkages in addition to the carbonate groups. These block copolymers can be described as ABA polyols where A represents the polycarbonate block and B the urethane block. To produce such block polyols, one can react a diol (X) such as 1,6-hexanediol or TONE 0201 (a polycaprolactone diol available from Union Carbide) with an excess of an isocyanate (Y) such at 2,2,4-trimethylhexamethylene diisocyanate to form a urethane block that is isocyanate functional. For example, the reaction product of 2 moles of diol (X) with 3 moles of diisocyanate (Y) could be described as a Y-X-Y-X-Y block. The diol and diisocyanate are allowed to react until the NCO equivalent weight is constant.

The final ABA block polyol is then formed by the addition of a molar excess (relative to B block) of the polycarbonate diol (A). For example when 2 moles of the polycarbonate diol are added to 1 moles of the urethane block (B) the average statistical structure can be described as an ABA block copolymer. If one were to react 3 moles of the polycarbonate diol (A) to 2 moles of the urethane block (B) the average statistical structure can be described as A-B-A-B-A block copolymer. It has been found that incorporation of such urethane blocks into the polycarbonate containing polyol improves the compatibility robustness profile (reduced Haze) of the cured optical coating without sacrificing other critical performance properties such as fade speed.

Representative diols (X) include, but are not limited to, ethylene glycol, propylene glycol, 1,4-butanediol, 1,6-hexanediol, neopentyl glycol, diethylene glycol, glycerol, 1,4-cyclohexanedimethanol, 2-ethyl-1,3-hexanediol, polytetrahydrofuran, ethoxylated bisphenol A, esterdiol 204, trimethylol propane, and pentaerythritol.

Representative diisocyanates (Y) include, but are not limited to, hexamethylenediisocyanate (HDI), 2,2,4-trimethylhexamethylenediisocyanate (TMDI), isophoronediisocyanate (IPDI), Desmodur W, tetramethylxylylenediisocyanate (TMXDI), dimerdiisocyanate (DDI).

Ester linkages may be added along the backbone of the polymeric polyol. Extension of the polycarbonate with polyester functionality may be done using a Lewis acid catalyst (such as, but not limited to, tin(II) ethylhexanoate, triethyl aluminum, tri-isopropoxide aluminum, Borchi Kat® 22, dibutyltin(IV) dilaurate, etc.) or amine catalyst (such as, but not limited to, 1,3,4,6,7,8-hexahydro-2H-pyrimido[1,2-a]-pyrimidine) by means of ring opening polymerizations (ROP). Extending the molecular weight of the polycarbonate includes the use of ester and urethanes by reacting the polycarbonate simultaneously with lactone using ROP and free isocyanate in the presence of dibutyltin(IV) dilaurate.

The curable, organic polymeric photochromic compositions of the present invention further comprise a curing, or crosslinking, agent having reactive functional groups capable of reacting with hydroxyl groups on the polymeric polyol. Examples of suitable curing agents include aminoplasts, polyisocyanates, polyacids, anhydrides and mixtures thereof.

Useful aminoplasts can be obtained, for example, from the condensation reaction of formaldehyde with an amine or amide. Examples of amines or amides include but are not limited to melamine, urea and benzoguanamine.

Although condensation products obtained from the reaction of alcohols and formaldehyde with melamine, urea or benzoguanamine are most common, condensates with other amines or amides can be used. Formaldehyde is the most commonly used aldehyde, but other aldehydes such as acetaldehyde, crotonaldehyde, and benzaldehyde can also be used.

The aminoplast can contain imino and methylol groups. In certain instances, at least a portion of the methylol groups can be etherified with an alcohol to modify the cure response. Any monohydric alcohol like methanol, ethanol, n-butyl alcohol, isobutanol, and hexanol can be employed for this purpose. Examples of suitable aminoplast resins are commercially available from Cytec Industries, Inc. under the trademark CYMEL® and from Solutia, Inc. under the trademark RESIMENE®. Particularly useful aminoplasts include CYMEL® 385 (suitable for water-based compositions), CYMEL® 1158 imino-functional melamine formaldehyde condensates, and CYMEL® 303.

Other crosslinking agents suitable for use include polyisocyanate crosslinking agents. As used herein, the term "polyisocyanate" is intended to include blocked (or capped) polyisocyanates as well as unblocked polyisocyanates. The polyisocyanate can be aliphatic, aromatic, or a mixture thereof. Although higher polyisocyanates such as isocyanurates of diisocyanates are often used, diisocyanates can also be used. Isocyanate prepolymers, for example reaction products of polyisocyanates with polyols can also be used. Mixtures of polyisocyanate crosslinking agents can be used.

The polyisocyanate which is utilized as a crosslinking agent can be prepared from a variety of isocyanate-containing materials. Examples of suitable polyisocyanates include trimers prepared from the following diisocyanates: toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and 4,4'-diphenylmethylene diisocyanate. In addition, blocked polyisocyanate prepolymers of various polyols such as polyester polyols can also be used.

Isocyanate groups may be capped or uncapped as desired. If the polyisocyanate is to be blocked or capped, any suitable aliphatic, cycloaliphatic, or aromatic alkyl monoalcohol or phenolic compound known to those skilled in the art can be used as a capping agent for the polyisocyanate. Examples of suitable blocking agents include those materials which would unblock at elevated temperatures such as lower aliphatic alcohols including methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers may also be used as capping agents. Suitable glycol ethers include ethylene glycol butyl ether, diethylene glycol butyl ether, ethylene glycol methyl ether and propylene glycol methyl ether. Other suitable capping agents include oximes such as methyl ethyl ketoxime, acetone oxime and cyclohexanone oxime, lactams such as epsilon-caprolactam, pyrazoles such as dimethylpyrazole, and amines such as dibutyl amine.

Examples of suitable polycarboxylic acids include adipic, succinic, sebacic, azelaic, and dodecanedioic acid. Other suitable polyacid crosslinking agents include acid group-containing acrylic polymers prepared from an ethylenically unsaturated monomer containing at least one carboxylic acid group and at least one ethylenically unsaturated monomer that is free from carboxylic acid groups. Such acid functional acrylic polymers can have an acid number ranging from 30 to 150. Acid functional group-containing polyesters can be used as well. Low molecular weight polyesters and half-acid esters can be used which are based on the condensation of aliphatic polyols with aliphatic and/or aromatic polycarboxylic acids or anhydrides. Examples of suitable aliphatic polyols include ethylene glycol, propylene glycol, butylene glycol, 1,6-hexanediol, trimethylol propane, di-trimethylol propane, neopentyl glycol, 1,4-cyclohexanedimethanol, pentaerythritol, and the like. The polycarboxylic acids and anhydrides may include, inter alia, terephthalic acid, isophthalic acid, phthalic acid, phthalic anhydride, tetrahydrophthalic acid, tetrahydrophthalic anhydride, hexahydrophthalic anhydride, methylhexahydrophthalic anhydride, chlorendic anhydride, and the like. Mixtures of acids and/or anhydrides may also be used. The above-described polyacid crosslinking agents are described in further detail in U.S. Pat. No. 4,681,811 at column 6, line 45 to column 9, line 54, which is incorporated herein by reference.

The curable compositions of the present invention may contain other resins different from and in addition to the polymeric polyols described above. Examples of organic polyols that may be used in the present invention in addition to the aforedescribed polycarbonate polyols include (a) polyester polyols; (b) polyether polyols; (c) amide-containing polyols; (d) polyacrylic polyols; (e) epoxy polyols; (f) polyhydric polyvinyl alcohols; (g) urethane polyols; and (h) mixtures of such polyols. In one contemplated embodiment, the additional organic polyols are selected from the group consisting of polyacrylic polyols, polyether polyols, polyester polyols, urethane polyols and mixtures thereof. In another contemplated embodiment, the additional organic polyols are selected from the group consisting of polyacrylic polyols, polyether polyols, urethane polyols and mixtures thereof.

Polyester polyols are generally known and can have a number average molecular weight in the range of from 500 to 10,000. They are prepared by conventional techniques utilizing low molecular weight diols, triols and polyhydric alcohols known in the art, including but not limited to the previously described polyols used in the preparation of polycarbonate polyols (optionally in combination with monohydric alcohols) with polycarboxylic acids. Examples of suitable polycarboxylic acids include: phthalic acid, isophthalic acid, terephthalic acid, trimellitic acid, tetrahydrophthalic acid, adipic acid, succinic acid, glutaric acid, fumaric acid, and mixtures thereof. Anhydrides of the above acids, where they exist, can also be employed and are encompassed by the term "polycarboxylic acid". In addition, certain materials which react in a manner similar to acids to form polyester polyols are also useful. Such materials include lactones, e.g., caprolactone, propiolactone and butyrolactone, and hydroxy acids such as hydroxycaproic acid and dimethylol propionic acid. If a triol or polyhydric alcohol is used, a monocarboxylic acid, such as acetic acid and/or benzoic acid, may be used in the preparation of the polyester polyols, and for some purposes, such a polyester polyol may be desirable. Moreover, polyester polyols are understood herein to include polyester polyols modified with fatty acids or glyceride oils of fatty acids (i.e., conventional alkyd polyols containing such modification). Another polyester polyol which may be utilized is one prepared by reacting an alkylene oxide, e.g., ethylene oxide, propylene oxide, etc., and the glycidyl esters of versatic acid with methacrylic acid to form the corresponding ester.

Polyether polyols are generally known and can have a number average molecular weight in the range of from 500 to 10,000 grams per mole. Examples of polyether polyols include various polyoxyalkylene polyols, polyalkoxylated polyols having a molecular weight greater than 500 grams per mole, e.g., poly(oxytetramethylene)diols, and mixtures thereof. The polyoxyalkylene polyols can be prepared, according to well-known methods, by condensing alkylene oxide, or a mixture of alkylene oxides using acid or base catalyzed addition, with a polyhydric initiator or a mixture of polyhydric initiators such as ethylene glycol, propylene glycol, glycerol, sorbitol and the like. Illustrative alkylene oxides include ethylene oxide, propylene oxide, butylene oxide, amylene oxide, aralkylene oxides, e.g., styrene oxide, and the halogenated alkylene oxides such as trichlorobutylene oxide and so forth. The more preferred alkylene oxides include propylene oxide and ethylene oxide or a mixture thereof using random or step-wise oxyalkylation. Examples of such polyoxyalkylene polyols include polyoxyethylene, i.e., polyethylene glycol, polyoxypropylene, i.e., polypropylene glycol. The molecular weight of such polyoxyalkylene polyols used as the soft segment is preferably equal to or greater than 600, more preferably, equal to or greater than 725, and most preferably, equal to or greater than 1000 grams per mole.

Polyalkoxylated polyols having a number average molecular weight greater than 500 grams per mole may be represented by the following general formula H—(O—CHR$_1$—CH$_2$)$_m$—O-A-O—(CH$_2$—CHR$_2$—O)$_n$—H wherein m and n are each a positive number, the sum of m and n being from 5 to 70, R$_1$ and R$_2$ are each hydrogen, methyl or ethyl, preferably hydrogen or methyl and A is a divalent linking group selected from the group consisting of straight or branched chain alkylene (usually containing from 1 to 8 carbon atoms), phenylene, C$_1$-C$_9$ alkyl substituted phenylene and a group represented by the following general formula II

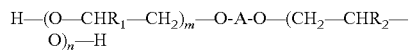

wherein R$_3$ and R$_4$ are each C$_1$-C$_4$ alkyl, chlorine or bromine, p and q are each an integer from 0 to 4,

represents a divalent benzene group or a divalent cyclohexane group, and D is O, S, —S(O$_2$)—, —C(O)—, —CH$_2$—, —CH═CH—, —C(CH$_3$)$_2$—, —C(CH$_3$)(C$_6$H$_5$)— or

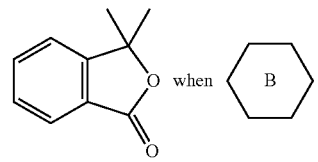 when 

is the divalent benzene group, and D is O, S, —CH$_2$—, or —C(CH$_3$)$_2$— when

is the divalent cyclohexane group. In one contemplated embodiment, the polyalkoxylated polyol is one wherein the sum of m and n is from 15 to 40, e.g., 25 to 35, R$_1$ and R$_2$ are each hydrogen, and A is a divalent linking group according to general formula II wherein

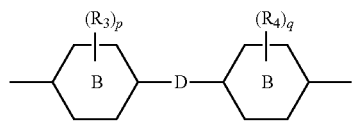

represents a divalent benzene group, p and q are each 0, and D is —C(CH$_3$)$_2$—. In another contemplated embodiment, the sum of m and n is from 25 to 35, e.g., 30. Such materials may be prepared by methods which are well known in the art. One such commonly used method involves reacting a polyol, e.g., 4,4'-isopropylidenediphenol, with an oxirane containing substance, for example ethylene oxide, propylene oxide, .alpha.-butylene oxide or .beta.-butylene oxide, to form what is commonly referred to as an ethoxylated, propoxylated or butoxylated polyol having hydroxy functionality.

Examples of polyols that may be used in preparing the polyalkoxylated polyols include the polyols used in the preparation of the polycarbonate polyols described herein, e.g., trimethylolpropane and pentaerythritol; phenylene diols such as ortho, meta and para dihydroxy benzene; alkyl substituted phenylene diols such as 2,6-dihydroxytoluene, 3-methylcatechol, 4-methylcatechol, 2-hydroxybenzyl alcohol, 3-hydroxybenzyl alcohol, and 4-hydroxybenzyl alcohol; dihydroxybiphenyls such as 4,4'-dihydroxybiphenyl and 2,2'-dihydroxybiphenyl; bisphenols such as 4,4'-isopropylidenediphenol; 4,4'-oxybisphenol; 4,4'-dihydroxybenzenephenone; 4,4'-thiobisphenol; phenolphthalein; bis(4-hydroxyphenyl)methane; 4,4'-(1,2-ethenediyl)bisphenol; and 4,4'-sulfonylbisphenol; halogenated bisphenols such as 4,4'-isopropylidenebis(2,6-dibromophenol), 4,4'-isopropylidenebis(2,6-dichlorophenol) and 4,4'-isopropylidenebis(2,3,5,6-tetrachlorophenol); and biscyclohexanols, which can be prepared by hydrogenating the corresponding bisphenols, such as 4,4'-isopropylidene-iscyclohexanol; 4,4'-oxybiscyclohexanol; 4,4'-thiobiscyclohexanol; and bis(4-hydroxycyclohexanol)methane.

The polyether polyols also include the generally known poly(oxytetramethylene)diols prepared by the polymerization of tetrahydrofuran in the presence of Lewis acid catalysts such as boron trifluoride, tin (IV) chloride and sulfonyl chloride. The number average molecular weight of poly(oxytetramethylene)diols used as the soft segment ranges from 500 to 5000. In one contemplated embodiment, the number average molecular weight ranges from 650 to 2900, in another from 1000 to 2000, and in a further contemplated embodiment, 1000 grams per mole.

In one contemplated embodiment, the polyether polyols are selected from the group consisting of polyoxyalkylene polyols, polyalkoxylated polyols, poly(oxytetramethylene) diols and mixtures thereof. In another contemplated embodiment, the polyether polyols are selected from the group consisting of polyoxyalkylene polyols having a number average molecular weight of equal to or greater than 1,000 grams per mole, ethoxylated Bisphenol A having approximately 30 ethoxy groups, poly(oxytetramethylene)diols having a number average molecular weight of 1000 grams per mole and mixtures thereof.

Amide-containing polyols are generally known and typically are prepared from the reaction of diacids or lactones and polyols used in the preparation of polycarbonate polyols described herein with diamines or aminoalcohols as described hereinafter. For example, amide-containing polyols may be prepared by the reaction of neopentyl glycol, adipic acid and hexamethylenediamine. The amide-containing polyols may also be prepared through aminolysis by the reaction, for example, of carboxylates, carboxylic acids, or lactones with amino alcohols. Examples of suitable diamines and amino alcohols include hexamethylenediamines, ethylenediamines, phenylenediamine, monoethanolamine, diethanolamine, isophorone diamine and the like.

Epoxy polyols are generally known and can be prepared, for example, by the reaction of glycidyl ethers of polyphenols such as the diglycidyl ether of 2,2-bis(4-hydroxyphenyl)propane, with polyphenols such as 2,2-bis(4-hydroxyphenyl) propane. Epoxy polyols of varying molecular weights and average hydroxyl functionality can be prepared depending upon the ratio of starting materials used.

Polyhydric polyvinyl alcohols are generally known and can be prepared, for example, by the polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

Urethane polyols are generally known and can be prepared, for example, by reaction of a polyisocyanate with excess organic polyol to form a hydroxyl functional product. Examples of polyisocyanates useful in the preparation of urethane polyols include those described herein. Examples of organic polyols useful in the preparation of urethane polyols include the other polyols described herein, e.g., low molecular weight polyols, polyester polyols, polyether polyols, amide-containing polyols, polyacrylic polyols, epoxy polyols, polyhydric polyvinyl alcohols and mixtures thereof.

The polyacrylic polyols are generally known and can be prepared by free-radical addition polymerization techniques of monomers described hereinafter. In one contemplated embodiment, polyacrylic polyols have a weight average molecular weight of from 500 to 50,000 and a hydroxyl number of from 20 to 270. In another contemplated embodiment, the weight average molecular weight is from 1000 to 30,000 and the hydroxyl number is from 80 to 250. In still another contemplated embodiment, the weight average molecular weight is from 3,000 to 20,000 and the hydroxyl number is from 100 to 225.

Polyacrylic polyols include, but are not limited to, the known hydroxyl-functional addition polymers and copolymers of acrylic and methacrylic acids; their ester derivatives including, but not limited to, their hydroxyl-functional ester derivatives. Examples of hydroxy-functional ethylenically unsaturated monomers to be used in the preparation of the hydroxy-functional addition polymers include hydroxyethyl (meth)acrylate, i.e., hydroxyethyl acrylate and hydroxyethyl methacrylate, hydroxypropyl(meth)acrylate, hydroxybutyl (meth)acrylate, hydroxymethylethyl acrylate, hydroxymethylpropyl acrylate and mixtures thereof.

In one contemplated embodiment, the polyacrylic polyol is a copolymer of hydroxy-functional ethylenically unsaturated (meth)acrylic monomers and other ethylenically unsaturated monomers selected from the group consisting of vinyl aromatic monomers, e.g., styrene, .alpha.-methyl styrene, t-butyl styrene and vinyl toluene; vinyl aliphatic monomers such as ethylene, propylene and 1,3-butadiene; (meth)acrylamide; (meth)acrylonitrile; vinyl and vinylidene halides, e.g., vinyl chloride and vinylidene chloride; vinyl esters, e.g., vinyl acetate; alkyl esters of acrylic and methacrylic acids, i.e. alkyl esters of (meth)acrylic acids, having from 1 to 17 carbon atoms in the alkyl group, including methyl(meth)acrylate, ethyl(meth)acrylate, butyl(meth)acrylate, cyclohexyl(meth) acrylate, 2-ethylhexyl(meth)acrylate, isobornyl(meth)acrylate and lauryl(meth)acrylate; epoxy-functional ethylenically unsaturated monomers such as glycidyl(meth)acrylate; carboxy-functional ethylenically unsaturated monomers such as acrylic and methacrylic acids and mixtures of such ethylenically unsaturated monomers.

The hydroxy-functional ethylenically unsaturated (meth) acrylic monomer(s) may comprise up to 95 weight percent of the polyacrylic polyol copolymer. In one contemplated embodiment, it composes up to 70 weight percent, and in another, the hydroxy-functional ethylenically unsaturated (meth)acrylic monomer(s) comprises up to 45 weight percent of the total copolymer.

The polyacrylic polyols described herein can be prepared by free radical initiated addition polymerization of the monomer(s), and by organic solution polymerization techniques. The monomers are typically dissolved in an organic solvent or mixture of solvents including ketones such as methyl ethyl ketones, esters such as butyl acetate, the acetate of propylene glycol, and hexyl acetate, alcohols such as ethanol and butanol, ethers such as propylene glycol monopropyl ether and ethyl-3-ethoxypropionate, and aromatic solvents such as xylene and SOLVESSO 100, a mixture of high boiling hydrocarbon solvents available from Exxon Chemical Co. The solvent is first heated to reflux, usually 70 to 160.degree. C., and the monomer or a mixture of monomers and free radical initiator is slowly added to the refluxing solvent, over a period of about 1 to 7 hours. Adding the monomers too quickly may cause poor conversion or a high and rapid exothermic reaction, which is a safety hazard. Suitable free radical initiators include t-amyl peroxyacetate, di-t-amyl peroxyacetate and 2,2'-azobis(2-methylbutanenitrile). The free radical initiator is typically present in the reaction mixture at from 1 to 10 percent, based on total weight of the monomers. The polymer prepared by the procedures described herein is non-gelled and preferably has a molecular weight of from 500 to 50,000 grams per mole.

The curable compositions of the present invention may contain additional conventional adjuvants that impart desired properties or characteristics to the composition, or which are required by the process used to apply and cure the photochromic polymer composition as a coating on the surface of a substrate, or which enhance the performance of the coating. Such adjuvants include, but are not limited to, ultraviolet light absorbers, light stabilizers, such as hindered amine light stabilizers (HALS), asymmetric diaryloxalamide (oxanilide) compounds, singlet oxygen quenchers, e.g., a nickel ion complex with an organic ligand, antioxidants, e.g., polyphenolic antioxidants, heat stabilizers, rheology control agents, leveling agents, e.g., surfactants, free radical scavengers, tinting agents, e.g., dyes, and adhesion promoting agents, such as trialkoxysilanes, e.g., silanes having an alkoxy radical of 1 to 4 carbon atoms, including γ-glycidoxypropyl trimethoxy silane, γ-aminopropyl trimethoxysilane, 3,4-epoxy cyclohexylethyl trimethoxysilane, dimethyldiethoxysilane, aminoethyl trimethoxysilane, and 3-(trimethoxysilyl)propyl methacrylate. Mixtures of such photochromic/coating performance enhancing adjuvant materials may be used. Catalysts may also be incorporated into the composition as necessary to effect the necessary chemical reactions for cure.

After curing the composition of the present invention and the Photochromic Performance Test described herein in, the composition demonstrated a $T_{1/2}$ fade rate of less than 200 seconds, or less than 100 seconds, often less than 90 seconds, making it particularly suitable as a photochromic coating in a photochromic article such as a lens. For purposes of the present invention response testing to determine the T½ fade rate determined using an optical bench as described immediately below and with more specificity herein below in the Examples.

Photochromic Performance Test:

The Photochromic Performance Test is performed on the Bench for Measuring Photochromics ("BMP") optical bench made by Essilor, Ltd. France. The optical bench is maintained at a constant temperature of 73.4° F. (23° C.) during testing.

Prior to testing on the optical bench, each of the coated lenses is exposed to 365-nanometer ultraviolet light for about 10 minutes at a distance of about 14 centimeters to activate the photochromic materials. The UVA (315 to 380 nm) irradiance at the lens is measured with a LICOR® Model Li-1800 spectroradiometer. Typical irradiance levels are about 22.2 watts per square meter. The lens is placed under a 500 watt, high intensity halogen lamp for about 10 minutes at a distance of about 36 centimeters to bleach (inactivate) the photochromic materials. The illuminance at the lens is measured with the LICOR® spectroradiometer. Typical illuminance levels are about 21.9 Klux. The lenses are kept in a dark environment at room temperature (from 70 to 75° F., or 21 to 24° C.) for at least 1 hour prior to testing on an optical bench. Prior to optical bench measurement, the lenses are measured for ultraviolet absorbance at 390 nanometers.

The BMP optical bench is fitted with two 150-watt ORIEL® Model #66057 Xenon arc lamps at right angles to each other. The light path from Lamp 1 is directed through a 3 mm SCHOTT® KG-2 band-pass filter and appropriate neutral density filters that contribute to the required UV and partial visible light irradiance level. The light path from Lamp 2 is directed through a 3 mm SCHOTT® KG-2 hand-pass filter, a SCHOTT® short band 400 nm cutoff filter and appropriate neutral density filters in order to provide supplemental visible light illuminance. A 2 inch×2 inch 50% polka dot beam splitter, at 45° to each lamp is used to mix the two beams. The combination of neutral density filters and voltage control of the Xenon arc lamp are used to adjust the intensity of the irradiance. Proprietary software i.e., BMPSoft version 2.1e is used on the BMP to control timing, irradiance, air cell and sample temperature, shuttering, filter selection and response measurement. A ZEISS® spectrophotometer, Model MCS 501, with fiber optic cables for light delivery through the lens is used for response and color measurement. Photopic response measurements are collected on each lens.

The power output of the optical bench, i.e., the dosage of light that the lens is typically exposed to during testing, is adjusted to 6.7 Watts per square meter ($W/m^2$) UVA, integrated from 315-380 nm and 50 Klux illuminance, integrated from 380-780 nm. Measurement of this power setpoint is made using an irradiance probe and the calibrated Zeiss spectrophotometer. The lens sample cell is fitted with a quartz window and self-centering sample holder. The temperature in the sample cell is typically controlled at 23° C. through the software with a modified Facis, Model FX-10, environment simulator. Measurement of the sample's dynamic photochromic response and color measurements is made using the same Zeiss spectrophotometer, with fiber optic cables for light delivery from a tungsten halogen lamp and through the sample. The collimated monitoring light beam from the fiber optic cable is maintained perpendicular to the test sample while passing through the sample and directed into a receiving fiber optic cable assembly attached to the spectrophotometer. The exact point of placement of the sample in the sample cell is where the activating xenon arc beam and the monitoring light beam intersect to form two concentric circles of light. The angle of incidence of the xenon arc beam at the sample placement point is about 30° from perpendicular.

Response measurements, in terms of a change in optical density (SOD) from the unactivated or bleached state to the activated or colored state are determined by establishing the initial unactivated transmittance, opening the shutter from the Xenon lamp(s) and measuring the transmittance through activation at selected intervals of time. Change in optical density is determined according to the formula: $\Delta OD = \log(10)(\% Tb/\% Ta)$, where % Tb is the percent transmittance in the bleached state, % Ta is the percent transmittance in the activated state. Optical density measurements are based on photopic optical density, wherein the ΔOD at saturation is after 15 minutes of activation and the Fade Half Life ("T½") value is the time interval in seconds for the ΔOD of the activated form of the photochromic material in the coating to reach one half the fifteen-minute ΔOD at 73.4° F. (23° C.), after removal of the activating light source.

The present invention further provides a photochromic article comprising a rigid substrate and a photochromic organic polymeric coating applied to a surface of the substrate. The photochromic organic polymeric coating comprises the composition described above.

Rigid substrates to which the photochromic polymeric coating is applied may vary and include any rigid substrate having at least one surface that will support a photochromic polymeric coating. Examples of such rigid substrates include: paper, glass, ceramics, wood masonry, textiles, metals and organic polymeric materials. The particular substrate used will depend on the particular application that requires both a rigid substrate and a photochromic coating, which photochromic coating further requires the protection of a cross-linked polyhydroxy polymer film adjacent to the photochromic coating. The rigid substrate may also be transparent.

Polymeric substrates that may be used in preparing the photochromic articles of the present invention include organic polymeric materials and inorganic materials, such as glass. As used herein, the term "glass" is defined as being a polymeric substance, e.g., a polymeric silicate. Glass substrates may be of any type suitable for the intended purpose. In a non-limiting embodiment, the glass substrate is a clear, low colored, transparent glass such as the well-known silica type glass, particularly soda-lime-silica glass. The nature and composition of various silica glasses are well known in the art. The glass may be strengthened by either thermal or chemical tempering.

Polymeric organic substrates that may be used in preparing the photochromic articles of the present invention, are any of the currently known (or later discovered) plastic materials that are chemically compatible with the photochromic polymeric coating superposed on, e.g., applied to, the surface of the substrate. In a non-limiting embodiment, the polymeric organic substrate may be prepared from art-recognized polymers that are useful as optical substrates, e.g., organic optical resins that are used to prepare optically clear castings for optical applications, such as ophthalmic lenses.

Examples of organic substrates that can be used as polymeric organic substrates are polymers, e.g., homopolymers, oligomers and copolymers, including, but not limited to, substrates prepared from monomers and mixtures of monomers such as those disclosed from column 15, line 28 to column 16, line 17 of U.S. Pat. No. 5,658,501, which disclosure is incorporated herein by reference. Such organic substrates may be thermoplastic or thermoset polymeric substrates, e.g., transparent, more particularly, optically clear, substrates having a refractive index that desirably ranges from 1.48 to 1.74, e.g., 1.50 to 1.67.

Non-limiting examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc; polyurea-polyurethane (polyurea urethane) polymers, such as the polymers described in U.S. Pat. No. 6,127,505 (column 2, line 26 to column 6, line 5, which disclosure is incorporated herein by reference), such polyurea-urethane polymers being prepared, for example, by the reaction of a polyurethane prepolymer and a diamine curing agent, a composition for one such polymer being sold under the trademark TRIVEX by PPG Industries, Inc; acrylic functional monomers, such as but not limited to, polyol (meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bismethacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes, which include but are not limited to materials such as the MR-6, MR-7 and MR-8 optical resins from Mitsui Chemicals; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS; and polymers prepared by reacting polyfunctional isocyanate(s) and/or isothiocyanate(s) with polythiol(s) or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products. The organic polymeric substrate should be chemically compatible with the photochromic polymeric coating superposed on, e.g., applied to, the surface of the substrate. For optical applications, the substrate should be transparent.

Often, the rigid substrate is an organic polymeric substrate chosen from thermoset or thermoplastic materials having a refractive index of from 1.48 to 1.74. Materials demonstrating such properties include polymerizable compositions comprising allyl diglycol carbonate monomer(s), thermoplastic polycarbonates, polyurea urethanes or compositions comprising the reaction product of polyfunctional isocyanate(s) and/or isothiocyanate(s) with polythiol(s) or polyepisulfide monomer(s).

The polymeric organic substrate used to prepare the photochromic articles of the present invention may have a protective coating, e.g., an abrasion resistant coating, on its surface. For example, commercially available thermoplastic polycarbonate optical lenses are typically sold with an abrasion-resistant coating, e.g., a hard coating, already applied to its surface(s) because the surface tends to be readily scratched, abraded or scuffed. A non-limiting example of such an article is a polycarbonate lens (available from Gentex Optics) that is sold with a hard coating already applied to the polycarbonate surface. As used in this disclosure and claims, the terms "polymeric organic substrate" (or similar terms) or "surface" of such a substrate, is intended to mean and include either the polymeric organic substrate itself or such a substrate with a coating, e.g., protective coating and/or primer, on the substrate. Thus, when reference is made in this disclosure or claims to applying a primer coating or photochromic polymeric coating to the surface of the substrate, such reference includes applying such a coating to the polymeric organic substrate per se or to a coating, e.g., an abrasion-resistant coating, on the surface of the substrate. Hence, the term "substrate" includes substrates having a coating on its surface. The coating may be any suitable coating (other than a photochromic coating) and is not limited to an abrasion-resistant coating (hard coat), e.g., any protective coating or other coating that provides one or more additional functional properties to the article of which the substrate is a part.

Prior to applying the photochromic polymer coating to the surface of the substrate to be covered, it is common to clean and treat that surface so as to enhance adhesion of the photochromic coating to the substrate. Examples of cleansing methods include ultrasonic washing, washing with an aqueous soap/detergent solution (or washing with soap and water) followed by rinsing, and cleaning with an aqueous mixture of organic solvent, e.g., a 50:50 mixture of isopropanol/water or ethanol/water. Examples of further treatments include UV treatment, activated gas treatment, e.g., treatment with low temperature plasma or corona discharge (using inert gas such as argon or a reactive gas such as oxygen), and chemical treatment that results in hydroxylation of the substrate surface, e.g., etching of the surface with an aqueous solution of alkali metal hydroxide, e.g., sodium or potassium hydroxide, which solution can also contain a fluorosurfactant. The alkali metal hydroxide solution may be a dilute aqueous solution, e.g., from 5 to 40 weight percent alkali metal hydroxide. The concentration of the alkali metal hydroxide solution may range from 10 to 15 weight percent, e.g., 12 weight percent. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials. Such disclosures are incorporated herein by reference.

In certain embodiments, a primer coating is applied to the plastic surface substrate before application of the photochromic coating. The primer may be applied to the rigid substrate by any of the methods used to apply the photochromic coating, e.g., spray, spin, spread, curtain, roll or dip coating; and can be applied to a cleaned and untreated or cleaned and treated, e.g., chemically treated, surface of the substrate. Primer coatings are well known to those skilled in the art. The thickness of the primer coating may vary from one to several monomolecular layers. The thickness of the primer coating may range from 0.1 to 10 microns, e.g., from 0.1 to 2 or 3 microns. The thickness of the primer coating may vary between any combination of the aforementioned values, inclusive of the recited values. Examples of primer coatings include coatings comprising an organofunctional silane, such as methacryloxypropyl trimethoxysilane, and coatings comprising a composition that is substantially free of organosiloxanes and which comprises organic anhydrides having at least one ethylenic linkage and an isocyanate-containing material.

Typically, the photochromic coating applied to the surface of the rigid substrate will have a thickness of at least 3 microns. In alternate non-limiting embodiments, the thickness of the photochromic coating is at least 5 microns, such as at least 10 microns, e.g., 20 or 30 microns. Usually, the applied photochromic coating will have a thickness of not more than 200 microns, or not more than 100 microns, such as not more than 50 microns, e.g., 40 microns. The thickness of the photochromic coating may range between any combinations of these values, inclusive of the recited values. For example, the thickness of the photochromic coating may range from 10 to 50 microns, e.g., 20 to 40 microns. The applied photochromic coating is preferably free of cosmetic defects, such as scratches, pits, spots, cracks, inclusions, etc.

In coating parlance, the term "coating" is considered to be a layer having a thickness of not more than 4 mils (about 100 microns). However, as used in this specification and claims in relation to the photochromic coating, the term "coating" is used herein to mean a coating having a thickness within the range of thicknesses stated hereinabove.

Further, as used in this specification and claims, it is intended that the term "surface of the polymeric substrate" or like terms, e.g., the surface to which the photochromic polymeric coating is applied, includes embodiments in which only a portion of the surface of the substrate is coated. Hence, the photochromic coating (and the further organic polymer layer that may be applied to the photochromic coating) may cover only a portion of at least one surface of the substrate.

The cured photochromic polymer coating is sufficiently hard to be physically/mechanically handled without causing blemishes, e.g., scratches, on the coating. The hardness of coatings or films may be quantified by tests known to the skilled artisan, e.g., Fischer microhardness, pencil hardness or Knoop hardness.

The photochromic polymer coating composition is applied to the surface of the rigid substrate and then cured by methods well known to those skilled in the art. Such application methods include the art-recognized methods of spin coating, curtain coating, dip coating, spray coating or by methods used in preparing overlays. Such methods are described in U.S. Pat. No. 4,873,029.

After the photochromic polymer coating formulation is applied to the surface of the plastic substrate, it is cured at room temperature or by the application of heat. The specific cure conditions used will depend on the plastic substrate, the functional components in the formulation and the type of catalyst used. Thermal curing may involve heating from room temperature up to temperatures below which the plastic substrate or photochromic material is not damaged due to such heating. Temperatures up to 200° C. have been reported. Such cure conditions are well known in the art. For example, a typical thermal cure cycle involves heating the formulation from room temperature (22° C.) to from 85 to 140° C. over a period of from 2 to 90 minutes. When the cure conditions produce a coating that can be physically handled but is not completely cured, an additional thermal post cure step can also be employed to fully cure the photochromic coating.

The photochromic articles of the present invention may have additional layers applied on top of the photochromic polymeric coating. Such layers include tie layers, abrasion resistant hard coats, anti-reflective coatings, and the like. Non-limiting examples of antireflective coatings are described in U.S. Pat. No. 6,175,450 and International Patent Publication WO 00/33111, which disclosures of antireflective coatings are incorporated herein by reference.

Photochromic articles of the present invention may be used in a variety of applications. In alternate non-limiting embodiments, the photochromic articles may be designed for use on transparent, e.g., optical, plastic substrates intended for ophthalmic applications, such as plano and vision correcting lenses, sun lenses and goggles, commercial and residential windows, automotive and aircraft transparencies, helmets, clear films, etc. Further, the photochromic articles of the present invention may be used in association with plastic films and sheets, optical devices, e.g., optical switches, display devices and memory storage devices, such as those described in U.S. Pat. No. 6,589,452, and security elements, such as optically-readable data media, e.g., those described in U.S. Patent Application 2002/0142248, security elements in the form of threads or strips, as described in U.S. Pat. No. 6,474,695, and security elements in the form of verification marks that can be placed on security documents and articles of manufacture.

In certain embodiments of the present invention, an abrasion-resistant coating is superposed, e.g., superimposed, on the further transparent organic polymeric layer. In such an embodiment, a post thermal cure (if used) may be postponed until after application of the abrasion-resistant coating if there is no significant physical handling of the product until after application of the abrasion-resistant coating. If such extensive handling is required, a thermal post cure may be performed prior to application of the abrasion-resistant coating.

Scratch resistance of polymer layers may be measured by conventional steel wool scratch tests known to those skilled in the art. This test measures the average haze gain of a surface subjected to abrasion by very fine steel wool. In accordance a non-limiting embodiment of the present invention, the average haze gain of a polymer layer providing scratch resistance may be less than 20. In alternate non-limiting embodiments, the average haze gain of a polymer providing scratch resistance may be less than 15, such as less than 10, e.g., less than 8. An Eberbach Steel Wool Abrasion Tester may be used to determine surface scratch resistance. A Bayer Abrasion Tester may also be used to determine surface abrasion resistance.

The abrasion-resistant coating (hard coat) may be superposed on, e.g., applied to, a transparent polymer tie layer using the same application techniques described with respect to the photochromic coating, e.g., spin coating. The thickness of the abrasion resistant film may range from 0.5 to 10 microns.

The present invention is more particularly described in the following examples, which are intended as illustrative only, since numerous modifications and variations therein will be apparent to those skilled in the art.

The invention is further described in conjunction with the following examples, which are to be considered as illustrative rather than limiting, and in which all parts are parts by weight and all percentages are percentages by weight, based on the total weight of the composition, unless otherwise specified. In Part 1, preparation of the polycarbonate polyols A, B and C is described. In Part 2, preparation of the compositions and articles of the present invention as well as comparative examples are described. In Part 3, the results of microhardness and the Photochromic Performance Test of Examples 1-3 and Comparative Examples 1 and 2 are described.

EXAMPLES

Part 1

Preparation of the Polycarbonate Polyols

Polycarbonate Polyol A (PP-A) was prepared as follows: into a 5-liter flask was added 1000 grams (g) of RAVECARB® 107 polycarbonate polyol available from Enichem and 2220 g of methanol and a nitrogen blanket was applied. The resulting mixture was stirred and heated until reaching 61° C. at which temperature it was maintained for 15 minutes. The resulting mixture was transferred into a separatory funnel and kept at room temperature for 15 minutes. After separation, the bottom layer was collected in a 5-liter flask. The process was repeated three more times using 1900 g of methanol each time. The methanol from the final bottom layer collected was removed by distillation resulting in 590 g of a viscous liquid. The level of methanol remaining in the recovered material was 0.16% and the hydroxyl number was 31.3 mg KOH/g. The number average molecular weight as determined by gel permeation chromatography using polystyrene standards was 6450 g/mole and the weight average molecular weight was 8,590 g/mole. The polydispersity index was 1.33.

Polycarbonate Polyol B (PP-B) was prepared following the procedure used to prepare PP-A except that a 1-liter flask, 250 grams (g) of ETERNACOLL® PH200D polycarbonate polyol available from UBE Americas Inc. and 600 mL of methanol were used; 600 mL of methanol was used for each of the three additional separations and the amount of product recovered was 150 g. The product had a methanol level of less than 0.03% and the hydroxyl number was 30.3 mg KOH/g. The number average molecular weight as determined by gel permeation chromatography using polystyrene standards was 6560 g/mole and the weight average molecular weight was 9,760 g/mole. The polydispersity index was 1.49.

Polycarbonate Polyol C was prepared following the procedure used to prepare PP-A except that ETERNACOLL® PH200D polycarbonate polyol was used in place of RAVECARB® 107 polycarbonate polyol and 605 g of viscous liquid was obtained having a methanol level of 0.15% and the hydroxyl number was 30.1 mg KOH/g. The number average molecular weight as determined by gel permeation chromatography using polystyrene standards was 6,610 g/mole and the weight average molecular weight was 8,690 g/mole. The polydispersity index was 1.32.

Polycarbonate Polyol D (PP-D) was prepared as follows:

Step 1—Into a 2-liter flask was added ETERNACOLL® PH200D polycarbonate polyol (400 g) and acetonitrile (400 mL) and the resulting mixture was stirred until homogenous; methanol (800 mL) was added slowly and the mixture was stirred for 30 minutes; the mixture was transferred into a separatory funnel and after 30 minutes the bottom layer of about 550 g was collected.

Step 2—The collected material from Step 1 was added into a 2-liter flask with acetonitrile (350 mL) and methanol (600 mL) was added and the resulting mixture was stirred for 30 minutes, transferred to a separatory funnel and after 30 minutes the bottom layer was collected.

Step 3—The procedure of Step 2 was repeated with the collected material from Step 2 except that 200 mL of acetonitrile and 400 mL of methanol were used.

Step 4—The procedure of Step 3 was repeated with the collected material from Step 3 and after removal of solvent, 65 g of a clear viscous material was recovered as the desired product. The number average molecular weight as determined by gel permeation chromatography using polystyrene standards was 10,100 g/mole and the weight average molecular weight was 12,600 g/mole. The polydispersity index was 1.25.

Polycarbonate-r-urethane-r-ester) Polyol E (PP-E) was prepared as follows: into a 500-milliliter flask with addition funnel, mechanical stirrer, and condenser tube, was added 101.5 grams (g) of ETERNACOLL® PH200D 0.39 g of tin (II) ethylhexanoate, and 16 g of DOWANOL® DPMA. A nitrogen blanket was applied, and the resulting mixture was stirred and heated to 117° C. A solution of 40.4 g caprolactone, 13.5 g of valerolactone, and 5.15 g of trimethyl hexamethylene diisocyanate (TMDI) was added over a 20 minute interval by addition funnel. The reaction was heated for 8 hours at 117° C. The reaction was used without further purification. The level of solids in the resulting material was measured at 89.2% in DOWANOL® DPMA and the hydroxyl number was 21.9 mg KOH/g. The solids level reported herein was determined by weighing a sample, heating it at 120 C for an hour, weighing it again and determining the percent solids remaining after the heating step. The number average molecular weight as determined by gel permeation chromatography using polystyrene standards was 9010 g/mole and the weight average molecular weight was 14,600 g/mole. The polydispersity index was 1.62.

Poly(carbonate-ester) Polyol F (PP-F) was prepared as follows: into a 1 liter-flask with mechanical stirrer and condenser tube, was added 395 grams (g) of ETERNACOLL® PH200D, 300.0 g caprolactone, and 100 g of valerolactone. A nitrogen blanket was applied. The resulting mixture was stirred, heated to 117° C., and 0.4 g of tin (II) ethylhexanoate was added by syringe. The reaction was heated for 18 hours at 117° C. The reaction was used without further purification. The level of solids in the resulting material was measured at 99.2% and the hydroxyl number was 33.6 mg KOH/g. The number average molecular weight as determined by gel permeation chromatography using polystyrene standards was 5430 g/mole and the weight average molecular weight was 9,020 g/mole. The polydispersity index was 1.66.

Polycarbonate urethane block copolymer Polyol G (PP-G) was prepared as follows: into a 100 ml flask was added 8.2 g of 2,2,4-trimethylhexamethylene diisocyanate, 3.1 g of 1,6-hexanediol, 0.08 g of dibutyltindilaurate, 0.04 g of triphenylphosphite and 21 g of DOWANOL® DPMA. The mixture was heated to 80° C. and held for 5 hours. The mixture was then cooled and to the mixture was added 52.3 g of ETERNACOLL® PH200D and 21 g of DOWANOL® DPMA. The temperature was raised to 80° C. and held until isocyanate was not observed by Infra-Red spectroscopy. The reaction mixture was cooled to provide a clear, viscous liquid with a solids content of 62%. The hydroxyl number based upon 100% resin solids was 28 mg KOH/g. The number average molecular weight as determined by gel permeation chromatography using polystyrene standards was 7170 g/mole and the weight average molecular weight was 13930 g/mole. The polydispersity index was 1.94. The urethane block in this material had a theoretical Mn~538.

Polycarbonate urethane block copolymer Polyol H (PP-H) was prepared as follows: into a 500 ml flask was added 25.2 g of 2,2,4-trimethylhexamethylene diisocyanate, 31.8 g of TONE 0201 polyol from Dow, 0.36 g of dibutyltindilaurate, 0.18 g of triphenylphosphite and 99.4 g of DOWANOL® DPMA. The mixture was heated to 80° C. and held for 5 hours. The mixture was then cooled and to the mixture was added 241.3 g of ETERNACOLL® PH200D and 99 g of DOWANOL® DPMA. The temperature was raised to 80° C. and held until isocyanate was not observed by IR. The reaction mixture was cooled to provide a clear, viscous liquid with a solids content of 60%. The hydroxyl number based upon 100% resin solids was 26 mg KOH/g. The number average molecular weight as determined by gel permeation chromatography using polystyrene standards was 7470 g/mole and the weight average molecular weight was 14300 g/mole. The polydispersity index was 1.91. The urethane block in this material a theoretical Mn~950.

Polycarbonate urethane block copolymer Polyol I (PP-I) was prepared as follows: into a 100 ml flask was added 4.4 g of 2,2,4-trimethylhexamethylene diisocyanate, 7.4 g of TONE 0201 polyol, 0.06 g of dibutyltindilaurate, 0.03 g of triphenylphosphite and 18 g of DOWANOL® DPMA. The mixture was heated to 80° C. and held for 5 hours. The mixture was then cooled and to the mixture was added 42 g of ETERNACOLL® PH200D and 26 g of DOWANOL® DPMA. The temperature was raised to 80° C. and held until isocyanate was not observed by IR. The reaction mixture was cooled to provide a clear, viscous liquid with a solids content of 50%. The hydroxyl number based upon 100% resin solids was 20 mg KOH/g. The number average molecular weight as determined by gel permeation chromatography using polystyrene standards was 10400 g/mole and the weight average molecular weight was 21300 g/mole. The polydispersity index was 2.05. The urethane block in this material had a theoretical Mn~1690.

Part 2

Preparation of Examples 1-3 and Comparative Examples 1 and 2

In the following examples, materials, such as dyes, polyols, catalysts, surfactants, etc., which are identified in one example by a lower case letter in parenthesis are used in subsequent comparative examples with the same lower case number. The combination of PC-1, PC-2, PC-3 and PC-4 resulted in an activated gray color.

Part 2-A

Preparation of Coating Formulations

The following materials were added in the order described to a suitable vessel equipped with an agitator.

| Charge 1 - Weight Percent of Each Component is Listed | | | |
|---|---|---|---|
| Material | Example 1 | Example 2 | Example 3 |
| DPMA[1] | 33.3636 | 34.1871 | 31.6369 |
| PC-1[2] | 0.7830 | 0.7809 | 0.7743 |
| PC-2[3] | 0.3601 | 0.3592 | 0.3561 |
| PC-3[4] | 0.6250 | 0.6234 | 0.6181 |
| PC-4[5] | 0.2888 | 0.2880 | 0.2855 |
| IRGANOX ® 245[6] | 0.6856 | 0.6838 | 0.6780 |
| TINUVIN ® 144[7] | 0.6856 | 0.6838 | 0.6780 |

[1]DOWANOL ® DPMA reported to be dipropylene glycol methyl ether acetate available from Dow.
[2]A green coloring photochromic indenonaphthopyran.
[3]A purple coloring photochromic indenonaphthopyran.
[4]A blue coloring photochromic indenonaphthopyran.
[5]A purple coloring photochromic indenonaphthopyran.
[6]IRGANOX ® 245—An antioxidant/stabilizer available from Ciba Specialty Chemicals Corp.
[7]TINUVIN ®-144 is a light stabilizer of the hindered amine class reported to have CAS# 63843-89-0 and is available from Ciba Specialty Chemicals.

| Charge 2 - Weight Percent of Each Component is Listed | | | |
|---|---|---|---|
| Material | Example 1 | Example 2 | Example 3 |
| A-187[8] | 2.2853 | 2.2792 | 2.2597 |
| K-KAT ® 348[9] | 2.2853 | 2.2792 | 2.2597 |
| BYK ® 333[10] | 0.03428 | 0.03419 | 0.03390 |

[8]SILQUEST ® A-187 is A gamma-glycidoxypropyl trimethoxysilane, which is available from Osi Specities of Paris, France.
[9]K-KAT ® 348 is a urethane catalyst reported to be a bismuth carboxylate available from King Industries Inc.
[10]BYK ® 333 is a polyether modified dimethylpolysiloxane compolymer, which is available from BYK-Chemie of Wallingford, Connecticut.

| Charge 3 - Weight Percent of Each Component is Listed | | | |
|---|---|---|---|
| Material | Example 1 | Example 2 | Example 3 |
| PMAP[11] | 10.1873 | 9.6362 | 12.0717 |
| Polycarbonate Polyol[12] | 17.3491 (PP-A) | 18.7619 (PP-B) | 11.5882 (PP-C) |
| HDI Biuret BI-7960[13] | 30.7585 | 29.0955 | 36.4548 |

[11]PMAP—A poly(meth)acrylic polyol produced by following the procedure of Composition D of Example 1 in U.S. Pat. No. 6,187,444, which procedure is incorporated herein by reference, except that in Charge 2, the styrene was replaced with methyl methacrylate and 0.5% by weight, based on the total monomer weight, of triphenyl phosphite was added.
[12]Polycarbonate polyols prepared in Part 1 or the commercial product used in the Comparative Examples.
[13]A blocked hexamethylene diisocyanate available from Baxenden Chemical Co. of Lancashire, England.

Charge 1 was added to the vessel with mixing and heated to 60° C. for approximately 30 minutes to dissolve the solids. Charge 2 was added to the solution and the resulting mixture was stirred for approximately 5 minutes. The materials of Charge 3 were added in the order listed to a separate container and mixed prior to adding it to the vessel containing Charges 1 and 2. The resulting mixture was placed in a 120 mL container and placed on a U.S. Stoneware Roll mixer at a dial setting of 40 for 2 hours.

Comparative Examples 1 and 2 were prepared following the procedures listed above for Examples 1-3 except using the materials listed below in each of Charges 1, 2 and 3.

| Material | Comparative Example 1 | Comparative Example 2 |
|---|---|---|
| | Charge 1 | |
| DPMA[1] | 31.5898 | 31.6369 |
| PC-1[2] | 0.7731 | 0.7743 |
| PC-2[3] | 0.3556 | 0.3561 |
| PC-3[4] | 0.6172 | 0.6181 |
| PC-4[5] | 0.2851 | 0.2855 |
| IRGANOX® 245[6] | 0.6770 | 0.6780 |
| TINUVIN® 144[7] | 0.6770 | 0.6780 |
| | Charge 2 | |
| A-187[8] | 2.2563 | 2.2597 |
| K-KAT® 348[9] | 2.2563 | 2.2597 |
| BYK® 333[10] | 0.03384 | 0.03390 |
| | Charge 3 | |
| PMAP[11] | 12.1756 | 12.0717 |
| Polycarbonate Polyol[12] | 11.2324 (RAVECARB® 107 polycarbonate polyol) | 11.5882 (ETERNACOLL® PH200D polycarbonate polyol) |
| HDI Biuret BI-7960[13] | 36.7661 | 36.4548 |

Part 2-B

Preparation of Coated Articles

Finished single vision polycarbonate lenses having a diameter of 70 mm obtained from Gentex Optics were used. The test lenses were treated with a corona discharge from a Tantec EST-Electrical Service Treatment unit operating at 500 Watts and 54 kVA for 45 seconds. The coatings of Examples 1-3 and Comparative Examples 1 and 2 were each applied by spin-coating separately to corona treated lens and cured at 125° C. for 60 minutes. The resulting cured coatings were approximately 20 microns thick. One set of lenses with the applied coated were subjected to Microhardness testing as described in Part 3-A.

Another set of coated lenses were treated by corona discharge from a Tantec unit operating at 20 Hertz and 0.70 kilowatts for 9 seconds. An acrylate-based formulation of the type described in Examples 1 and 2 of U.S. Pat. No. 7,410,691, which disclosure is incorporated herein by reference, was applied to the test lenses by spin coating and cured to result in coatings that were approximately 8 microns thick. Lenses having the two coatings were tested for photochromic performance as described in Part 3-B.

Part 3-A

Microhardness Testing

The coated lenses prepared in Part 2-B were subjected to microhardness testing using a FISCHERSCOPE® HCV, Model H-100 instrument available from Fischer Technology Inc. The microhardness is measured in Newtons per mm². Each lens was measured from 2 to 5 times and the resulting data was averaged. The hardness measurements were taken as the hardness at a penetration depth of 2 microns after a 100 Newton load for 15 seconds. The arithmetic average of the results of each lens tested is listed in Table 1.

TABLE 1

Fischer Microhardness Results

| Example No. | Microhardness (Newton/mm²) |
|---|---|
| 1 | 13 |
| 2 | 9 |
| 3 | 36 |
| CE-1 | 33 |
| CE-2 | 34 |

Part 3-B

Photochromic Performance Test

The photochromic performance of each of the aforementioned coating compositions was performed as follows. The coated lenses prepared above were tested in the Photochromic Performance Test on the Bench for Measuring Photochromics ("BMP") optical bench made by Essilor, Ltd. France. The optical bench was maintained at a constant temperature of 73.4° F. (23° C.) during testing.

Prior to testing on the optical bench, each of the coated lenses were exposed to 365-nanometer ultraviolet light for about 10 minutes at a distance of about 14 centimeters to activate the photochromic materials. The UVA (315 to 380 nm) irradiance at the lens was measured with a LICOR® Model Li-1800 spectroradiometer and found to be 22.2 watts per square meter. The lens was then placed under a 500 watt, high intensity halogen lamp for about 10 minutes at a distance of about 36 centimeters to bleach (inactivate) the photochromic materials. The illuminance at the lens was measured with the LICOR® spectroradiometer and found to be 21.9 Klux. The lenses, were then kept in a dark environment at room temperature (from 70 to 75° F., or 21 to 24° C.) for at least 1 hour prior to testing on an optical bench. Prior to optical bench measurement, the lenses were measured for ultraviolet absorbance at 390 nanometers.

The BMP optical bench was fitted with two 150-watt ORIEL® Model #66057 Xenon arc lamps at right angles to each other. The light path from Lamp 1 was directed through a 3 mm SCHOTT® KG-2 band-pass filter and appropriate neutral density filters that contributed to the required UV and partial visible light irradiance level. The light path from Lamp 2 was directed through a 3 mm SCHOTT® KG-2 band-pass filter, a SCHOTT® short band 400 nm cutoff filter and appropriate neutral density filters in order to provide supplemental visible light illuminance. A 2 inch×2 inch 50% polka dot beam splitter, at 45° to each lamp is used to mix the two beams. The combination of neutral density filters and voltage control of the Xenon arc lamp were used to adjust the intensity of the irradiance. Proprietary software i.e., BMPSoft version 2.1e was used on the BMP to control timing, irradiance, air cell and sample temperature, shuttering, filter selection and response measurement. A ZEISS® spectrophotometer, Model MCS 501, with fiber optic cables for light delivery through the lens was used for response and color measurement. Photopic response measurements were collected on each lens.

The power output of the optical bench, i.e., the dosage of light that the lens was exposed to, was adjusted to 6.7 Watts per square meter (W/m2) UVA, integrated from 315-380 nm and 50 Klux illuminance, integrated from 380-780 nm. Measurement of this power setpoint was made using an irradiance probe and the calibrated Zeiss spectrophotometer. The lens sample cell was fitted with a quartz window and self-centering sample holder. The temperature in the sample cell was controlled at 23° C. through the software with a modified Facis, Model FX-10, environment simulator. Measurement of the sample's dynamic photochromic response and color measurements was made using the same Zeiss spectrophotometer, with fiber optic cables for light delivery from a tungsten halogen lamp and through the sample. The collimated monitoring light beam from the fiber optic cable was maintained perpendicular to the test sample while passing through the sample and directed into a receiving fiber optic cable assembly attached to the spectrophotometer. The exact point of placement of the sample in the sample cell was where the activating xenon arc beam and the monitoring light beam intersected to form two concentric circles of light. The angle of incidence of the xenon arc beam at the sample placement point was ≈30° from perpendicular.

Response measurements, in terms of a change in optical density ($\Delta OD$) from the unactivated or bleached state to the activated or colored state were determined by establishing the initial unactivated transmittance, opening the shutter from the Xenon lamp(s) and measuring the transmittance through activation at selected intervals of time. Change in optical density was determined according to the formula: $\Delta OD = \log(10)(\% Tb/\% Ta)$, where % Tb is the percent transmittance in the bleached state, % Ta is the percent transmittance in the activated state. Optical density measurements were based on photopic optical density.

The results of this testing are presented below in Table 2, wherein the $\Delta OD$ at saturation is after 15 minutes of activation and the Fade Half Life ("T½") value is the time interval in seconds for the $\Delta OD$ of the activated form of the photochromic material in the coating to reach one half the fifteen-minute $\Delta OD$ at 73.4° F. (23° C.), after removal of the activating light source.

TABLE 2

Photochromic Performance Results

| Example # | $\Delta OD$ after 15 minutes | Fade Half Life (sec) |
|---|---|---|
| 1 | 0.93 | 82 |
| 2 | 0.92 | 79 |
| 3 | 0.86 | 96 |
| CE-1 | 0.82 | 123 |
| CE-2 | 0.82 | 125 |

Although the present invention has been described with reference to specific details of certain embodiments thereof, it is not intended that such details should be regarded as limitations upon the scope of the invention except insofar as they are included in the accompanying claims.

Although the present invention has been described with reference to specific details of certain embodiments thereof, it is not intended that such details should be regarded as limitations upon the scope of the invention except insofar as they are included in the accompanying claims.

We claim:

1. A curable, organic polymeric photochromic composition comprising:
   a) a photochromic amount of at least one photochromic material;
   b) a polymeric polyol having carbonate groups along its backbone and having a number average molecular weight greater than 5000 g/mole, wherein the polymeric polyol has a polydispersity index less than or equal to 1.50; and
   c) a curing agent having reactive functional groups capable of reacting with hydroxyl groups on the polymeric polyol b); wherein after curing and the Photochromic Performance Test, the composition demonstrates a $T_{1/2}$ fade rate of less than 90 seconds.

2. The composition of claim 1, wherein the polymeric polyol has a number average molecular weight greater than 6000 g/mole up to and including 20,000 g/mole.

3. A photochromic article comprising:
   (a) a rigid substrate,
   (b) a photochromic organic polymeric coating applied to a surface of said substrate, said photochromic coating comprising:
      i) a photochromic amount of at least one photochromic material;
      ii) a polymeric polyol having carbonate groups along its backbone and having a number average molecular weight greater than 5000 g/mole, wherein the polymeric polyol has a polydispersity index less than or equal to 1.50; and
      iii) a curing agent having reactive functional groups capable of reacting with hydroxyl groups on the polymeric polyol b); wherein after application of the coating to the substrate, after curing, and after the Photochromic Performance Test, the composition demonstrates a $T_{1/2}$ fade rate of less than 90 seconds.

4. The article of claim 3, wherein the polymeric polyol has a number average molecular weight greater than 6000 g/mole up to and including 20,000 g/mole.

5. The article of claim 3, wherein the rigid substrate is an organic polymeric substrate chosen from thermoset or thermoplastic materials having a refractive index of at least 1.48.

6. The article of claim 5, wherein the organic polymeric substrate comprises a thermoset substrate prepared from polymerizable compositions comprising allyl diglycol carbonate monomer(s), a substrate prepared from thermoplastic polycarbonates, a substrate prepared from polyurea urethanes or a substrate prepared from compositions comprising the reaction product of polyfunctional isocyanate(s) and/or isothiocyanate(s) with polythiol(s) or polyepisulfide monomer(s).

7. The article of claim 6, wherein the thermoset substrate is diethylene glycol bis(allyl carbonate).

8. The article of claim 3, wherein the photochromic material is an organic photochromic material comprising photochromic spirooxazines, benzopyrans, naphthopyrans, fulgides, metal dithizonates, diarylethenes or mixtures of such photochromic materials.

9. The article of claim 8, wherein the photochromic material is a naphthopyran comprising naphtho[1,2-b]pyrans, naphtho[2,1-b]pyrans, spiro-9-fluoreno[1,2-b]pyrans, phenanthropyrans, quinopyrans and/or indeno-fused naphthopyrans.

10. The article of claim 8, wherein the photochromic material is a spirooxazine comprising naphthoxazines and/or spiro(indoline)pyridobenzoxazines.

11. The article of claim 3, wherein the article is a lens.

* * * * *